(12) United States Patent
Wang et al.

(10) Patent No.: US 11,404,987 B2
(45) Date of Patent: Aug. 2, 2022

(54) MOTOR AND DRIVING DEVICE USING SAME

(71) Applicant: AAC Technologies Pte. Ltd., Singapore (SG)

(72) Inventors: Yao Wang, Shenzhen (CN); Kejia Liu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 110 days.

(21) Appl. No.: 16/994,641

(22) Filed: Aug. 16, 2020

(65) Prior Publication Data

US 2020/0412290 A1 Dec. 31, 2020

Related U.S. Application Data

(63) Continuation of application No. PCT/CN2019/094074, filed on Jun. 30, 2019.

(51) Int. Cl.
*H02P 25/034* (2016.01)
*H02K 33/18* (2006.01)
*H02K 11/215* (2016.01)

(52) U.S. Cl.
CPC .......... *H02P 25/034* (2016.02); *H02K 11/215* (2016.01); *H02K 33/18* (2013.01)

(58) Field of Classification Search
CPC ...... H02P 25/034; H02K 11/215; H02K 33/18
See application file for complete search history.

(56) References Cited

U.S. PATENT DOCUMENTS

| 7,768,160 B1 * | 8/2010 | Sahyoun | H02K 33/16 310/23 |
| 2018/0115230 A1 * | 4/2018 | Mao | H02K 11/215 |

* cited by examiner

*Primary Examiner* — Zoheb S Imtiaz
(74) *Attorney, Agent, or Firm* — W&G Law Group

(57) ABSTRACT

The present application discloses a linear motor having a housing with an accommodation space, stoppers fixed on the housing and set at intervals, a vibrator sliding between the stoppers and a power coil driving the vibrator to reciprocate motion. The stopper includes a first iron core fixed on the housing and an auxiliary coil twinned on the first iron core. The motor also includes a positioning sensor used to sense the motion of the vibrator to obtain a feedback signal. According to the feedback signal detected by the positioning sensor, the auxiliary coil and/or the power coil act on the vibrator so as to adjust the reciprocating motion of the vibrator between the stoppers. The effect of the motion of the plan of present application is good and control precision is high.

17 Claims, 6 Drawing Sheets

MOTOR AND DRIVING DEVICE USING SAME

FIELD OF THE PRESENT DISCLOSURE

The present application relates to technical field of tactile feedback technologies, especially relates to a motor and a driving device.

DESCRIPTION OF RELATED ART

Conventional linear motor can simplify a single degree of freedom system, which has a wide range of applications in all walks of life. The existing linear motor generally adopts coil manufacturing "electronic spring" design, which can control the performance of the motor artificially, but it belongs to the category of open-loop control, and the control algorithm needs to be set in advance. When the performance of the motor is inconsistent due to the manufacturing consistency deviation or the loss in the use process, the control algorithm has the risk of failure.

Therefore, it is necessary to provide a new motor to solve the above problems.

SUMMARY OF THE INVENTION

One of the main objects of the invention is to provide a motor which can perform relatively good closed-loop control even if being affected by inconsistencies in manufacturing processes.

In order to achieve the object mentioned above, the motor includes a housing with an accommodation space; a plurality of spaced stoppers fixed on the housing, each stopper including a first iron core fixed on the housing and an auxiliary coil wound around the first iron core; a vibrator slidably mounted between the stoppers; a power coil for driving the vibrator; a positioning sensor for sensing the motion of the vibrator for obtaining a feedback signal. The auxiliary coil and/or the power coil act on the vibrator so as to adjust the reciprocating motion of the vibrator between the stoppers, according to the feedback signal detected by the positioning sensor.

Further, the positioning sensor locates on the housing, the power coil or the stopper.

Further, the positioning sensor is a hall sensor.

Further, the motor further includes a limit member fixed on the stopper, wherein the limit member is fixed on one side of the first iron core facing the vibrator.

Further, the motor further includes a spring located between the stopper and the vibrator; wherein two ends of the spring are connected with the limit member and the vibrator separately.

Further, the housing includes a barrel-shaped main body having an accommodation space, and a cover body part covering on the opening of two sides of the main body; the vibrator is slidably connected in the main body; the first iron core is fixed on the cover body part; and the power coil is wound on one side of the main body away from the vibrator.

Further, the vibrator is a permanent magnet.

Further, the vibrator includes a second iron core located in a center position and a permanent magnet fixed on two ends of the second iron core; the power coil is wound around the second iron core.

Further, polarity of the permanent magnets fixed on two ends of the second iron core are oppositely configured.

In addition, the present invention further provides a driving device including a control module and a motor as described above. The control module and the motor are connected electrically. The control module is used to adjust the power coil and the auxiliary coil according to the feedback signal obtained by the positioning sensor sensing the motion of the vibrator.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

It should be noted that the description of "first", "second" and the like in the present application is only used for description purposes, and cannot be understood as indicating or implying its relative importance or implying the number of indicated technical features. Thus, a feature defined as "first" or "second" may include at least one such feature, either explicitly or implicitly. In addition, the technical solutions among the various embodiments can be combined with each other, but it must be based on that it can be realized by ordinary technicians. When the combination of the technical solutions is contradictory or cannot be realized, it should be considered that the combination of the technical solutions does not exist, nor is it within the scope of protection required by the present application.

Figure 1:
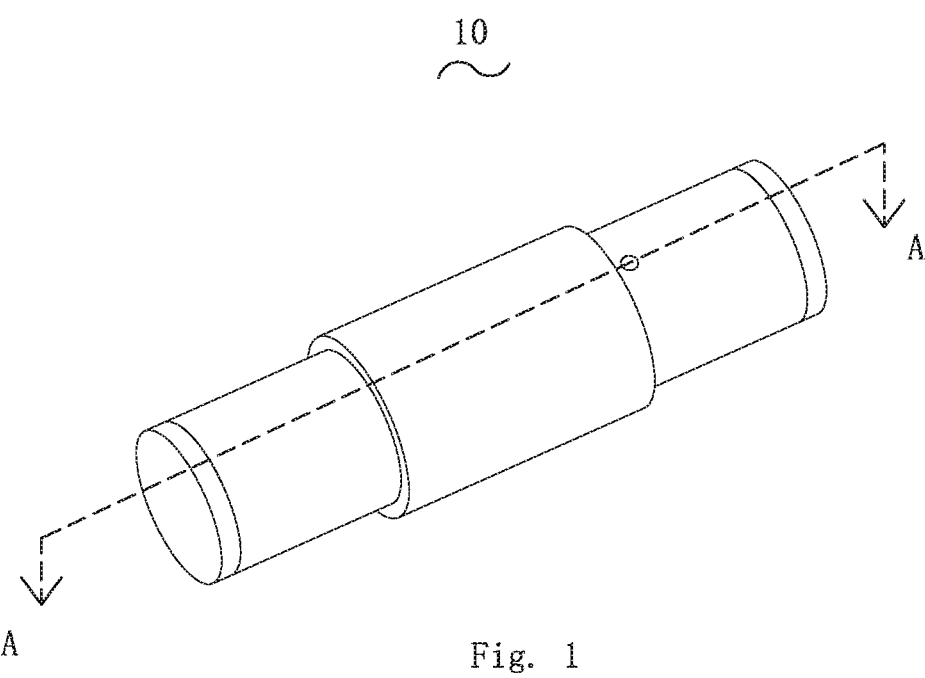
FIG. 1 is an isometric view of a motor in accordance with an exemplary embodiment of the present invention.
Figure 2:
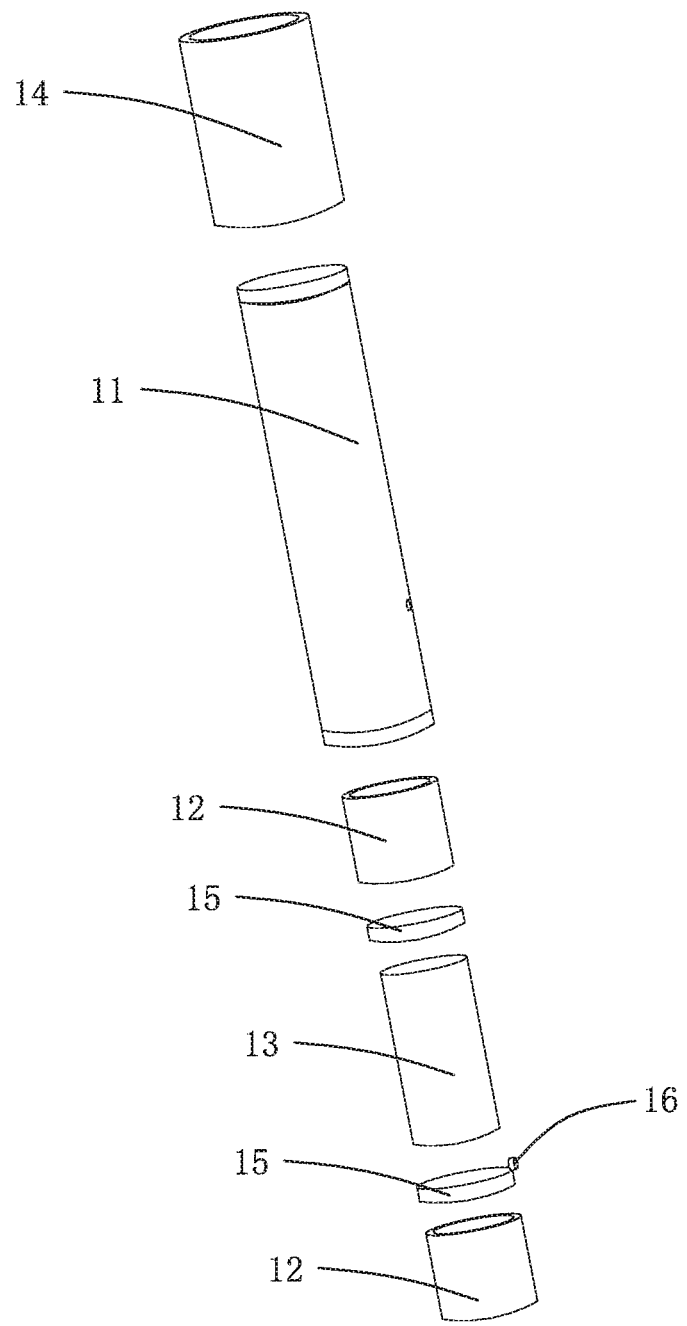
FIG. 2 is an exploded view of the motor in FIG. 1.
Figure 3:
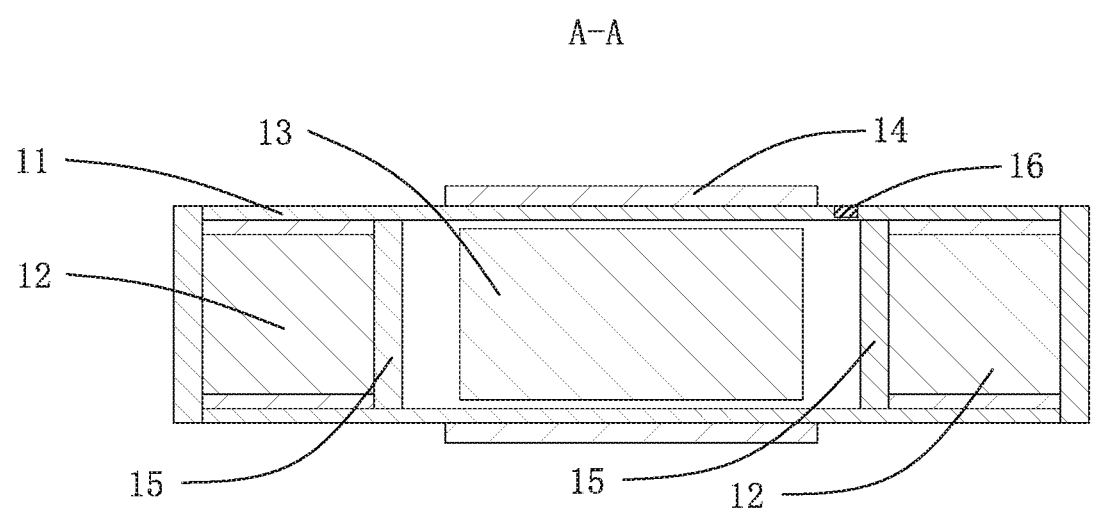
FIG. 3 is a cross-sectional view of the motor taken along line A-A in FIG. 1.

Please refer to FIGS. 1-3 together, a motor 10 provided by an embodiment of the present application can be used in the closed loop control device or system and is controlled by an external control module. The control accuracy of the motor 10 is high. The motor 10 includes a housing 11 with an s accommodation space, a plurality of spaced stoppers 12 fixed on the housing 11, a vibrator 13 slidably mounted between the stoppers 12, a power coil 14 driving for reciprocating motion of the vibrator 13 and a limit member 15 fixed on the stopper 12. Wherein, the vibrator 13, the stopper 12 and the limit member 15 are set in the accommodation space of the housing 11. The motor 10 also includes a positioning sensor 16 used for sensing the motion of the vibrator 13 to obtain a feedback signal. The positioning sensor 16 obtains the feedback signal of the vibrator 13. The stoppers 12 and or the power coil 14 acts on the vibrator 13 according to the feedback signal detected by the positioning sensor 16 so as to adjust the reciprocating movement of the vibrator 13 between the stoppers.

Figure 4:
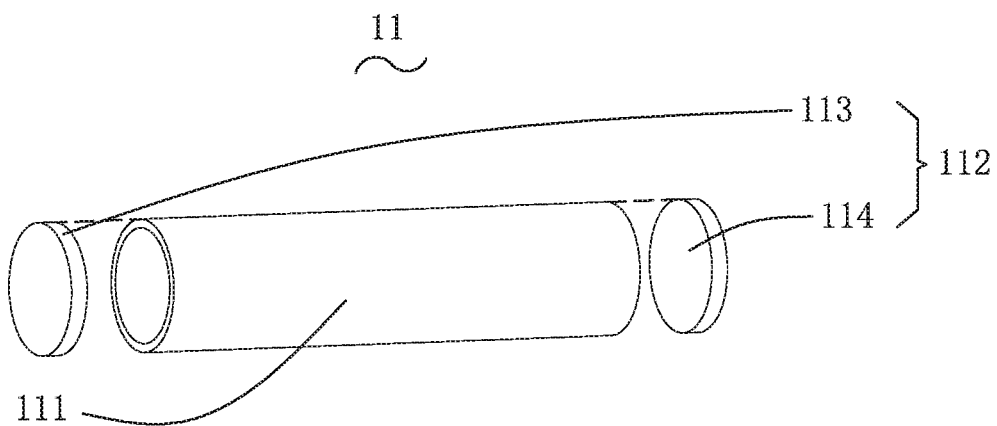
FIG. 4 is an exploded view of a housing of the motor.

Please refer to FIG. 4, the shape of the housing 11 is approximately hollow cylinder-shaped. The housing 11 includes a barrel-shaped main body 111 with accommodation space and a cover body part 112 covering on the opening of two sides of the main body 111 and the vibrator is slid and connected in the main body 111, wherein the cover body part includes a first cover body 113 and a second cover body 114.

The inner wall of the main body 111 is smooth. The vibrator 13 is set in the middle part of the main body 111. The vibrator 13 can slide inside the main body 111. The stopper 12 and the limit member 15 are located inside the main body 111.

Figure 5:
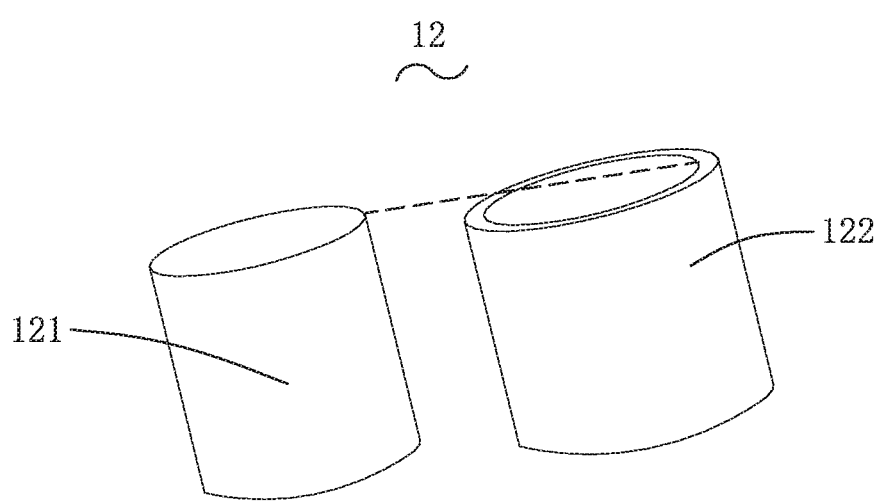
FIG. 5 is an exploded view of a stopper of the motor.

Please refer to FIG. 5, the stopper 12 includes a first iron core 121 fixed to a cover body part 112 of the housing 11 and an auxiliary coil 122 twinned in the first iron core 121, wherein, two stoppers 12 are included. Two stoppers 12 are set inside the main body 111. The first iron core 121 of the first stopper 12 is fixed on the first cover body 113 of the housing 11. The first iron core 121 of the second stopper 12 is fixed on the second cover body 114 of the housing 11. The auxiliary coil 122 of the stopper 12 can act on the vibrator 13 according to the feedback signal detected by the positioning sensor 16 so as to adjust the reciprocating motion of the vibrator 13 between two stoppers 12.

It should be noted that the power coil 14 and the auxiliary coil 122 can control current in the same direction through the same input port, or current in the different direction separately, which can be changed according to the needs.

Figure 6:
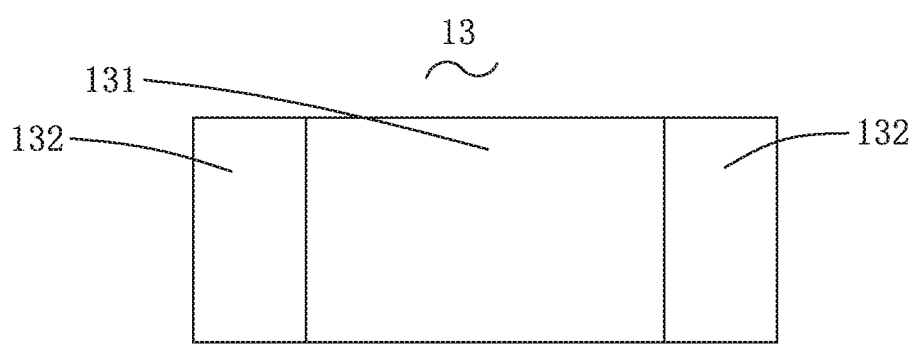
FIG. 6 is an isometric view of a vibrator of the motor.

Please refer to FIG. 6, the vibrator 13 has magnetic performance so that the power coil 14 and the stopper 12 can generate magnetic force to drive the vibrator 13 to move when energized. The vibrator 13 can have magnetic performance continuously and magnetic performance when the vibrator 13 is energized. Specifically, the vibrator 13 includes a permanent magnet, such as a magnet or the vibrator 13 including the second iron core 131 located in the middle position and the permanent magnet 132 fixed on two ends of the second iron core 131. The polarity of two permanent magnets 132 fixed on two ends of the second iron core 131 can be set opposite to each other. In other embodiments, the polarity of two permanent magnet 132 fixed on two ends of the second iron core 131 can be set as the same according to the actual requirements. When the vibrator 13 is energized and has magnetic performance, the magnetic field of the vibrator 13 can be controlled. The motion of the vibrator 13 can be controlled if the direction and the intensity of the passing current of the vibrator 13 is adjusted at the position that the positioning sensor 16 senses movement of the vibrator 13.

The power coil 14 is twinned on one side of the main body 111 away from the vibrator 13. The power coil 14 is located in the middle part of axial direction of the main body 111. When the vibrator 13 includes the second iron core 131 located in the middle position and the permanent magnet fixed on two ends of the iron core 131, the power coil 14 is twinned on the second iron core 131 and the power coil 14 is located on one side of the main body 111 away from the vibrator 13. When coil is energized, electromagnetic effect can be generated to generate the force to drive the reciprocating motion of the vibrator 13 inside the main body 111. It can be understood that slot can be made on the main body 111 to accommodate the power coil 14 to make the surface of the power coil 14 and the main body 111 flush.

The limit member 15 is fixed on one side of the first iron core 121 facing the vibrator 13. The limit member 15 includes two, the first limit member 15 is located between the vibrator 13 and the first stopper 12. The second limit member 15 is located between the vibrator 13 and the second stopper 12. The limit member 15 can limit the maximum displacement when the vibrator 13 moves.

The positioning sensor 16 can sense the position, speed or acceleration of the vibration 13 to obtain the feedback signal of the vibrator 13. The positioning sensor 16 can include a hall sensor, and the hall sensor can sense the position, speed or acceleration of the vibrator 13 through sensing the magnetic performance of the vibrator 13. The positioning sensor 16 is set on the main body 111 of the housing 11. Specifically, the positioning sensor 16 can be inlaid on the main body 111. On the axis direction of the main body 111, positioning sensor 16 is located between the power coil 14 and the limit member 15. In other embodiments, on the axis direction of the main body 111, the positioning sensor 16 can be overlaid with the power coil 14. If the positioning sensor 16 is inlaid on the main body 111, or the positioning sensor 16 is set on the power coil 14. Be optional, the positioning sensor 16 can be set between the limit member 15 or the stopper 12.

Figure 7:
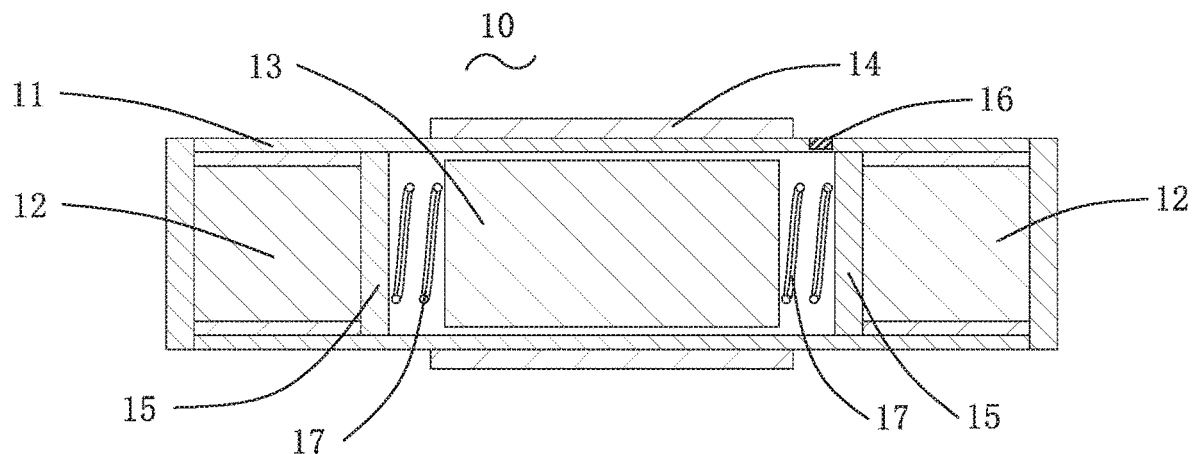
FIG. 7 is a cross-sectional view of a motor in accordance with another embodiment of the present invention.

Please refer to FIG. 7, the motor 10 further includes a spring 17 located between the stopper 12 and the vibrator 13. Two ends of the spring 17 can be connected with the limit member 15 and the vibrator 13 separately. The spring 17 is located in the main body 111. The spring 17 includes two. The first spring 17 is set between the vibrator 13 and the first limit member 15. The second spring 17 is set between the vibrator 13 and the second limit member 15. The spring 17 can provide resilience of movement for the vibrator 13. It can be understood that the spring 17 can adopt other components with elastic resilience for replacement.

Figure 8A:
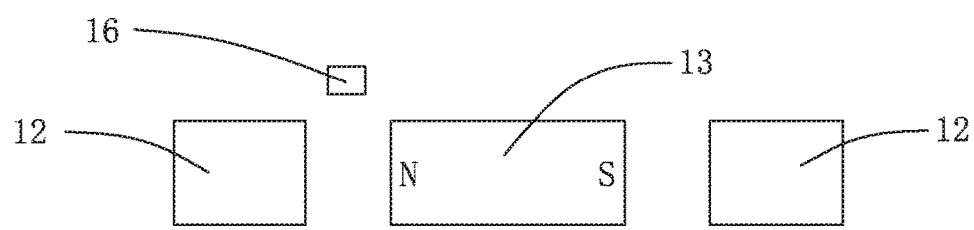
FIG. 8A shows a first status of the motor during work.

Please refer to FIG. 8A, during work, the vibrator 13 is in initial status. The power coil 14 and the stopper 12 are not energized. No force is generated for the vibrator 13.

Figure 8B:
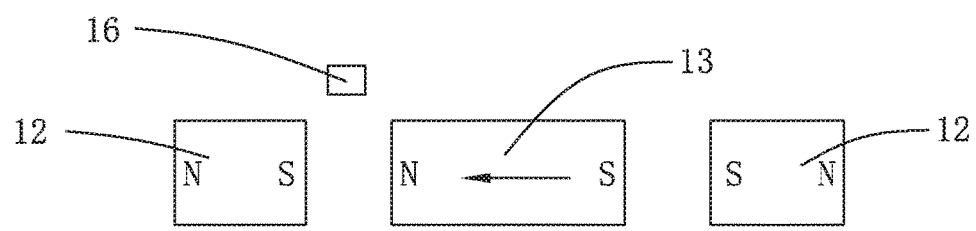
FIG. 8B shows a second status of the motor during work.

Please refer to FIG. 8B, the power coil 14, the first stopper 12 and the second stopper 12 are energized at the same time. The vibrator 13 is moving left. The power coil 14 gives the force to vibrator 13 to move left. The first stopper 12 gives suction to the vibrator 13. The second stopper 12 gives repulsive force to the vibrator 13.

Figure 8C:
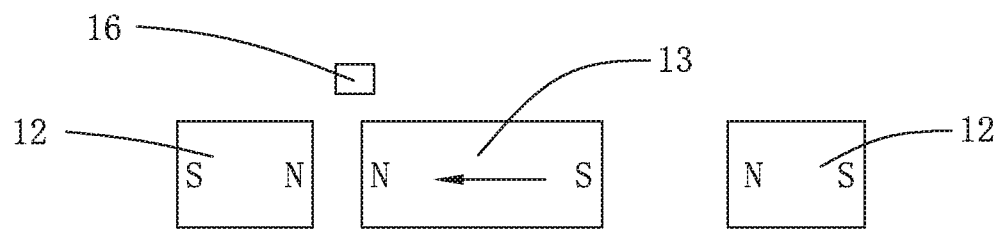
FIG. 8C shows a third status of the motor during work.

Please refer to FIG. 8C, position sensor detects the position, speed or acceleration of the vibrator 13. The power coil 14, the first stopper 12 and the second stopper 12 are energized and current changes. The power coil 14, the first stopper 12 and the second stopper 12 give force to the vibrator 13 to move right and the vibrator 13 move left or move by reducing the speed.

Figure 8D:
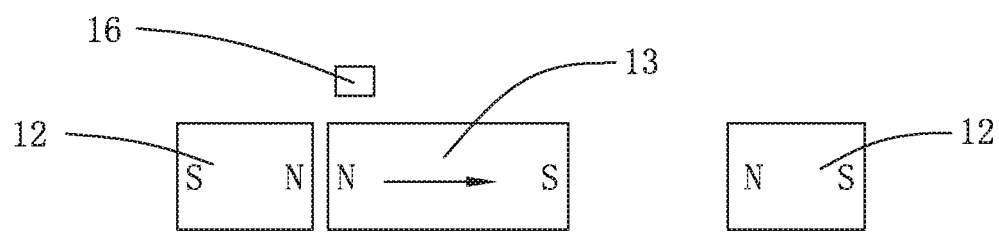
FIG. 8D shows a fourth status of the motor during work.

Please refer to FIG. 8D, the power coil 14, the first stopper 12 and the second stopper 12 separately gives the force to the vibrator 13 to move right and accelerate to move to the right.

Figure 9:
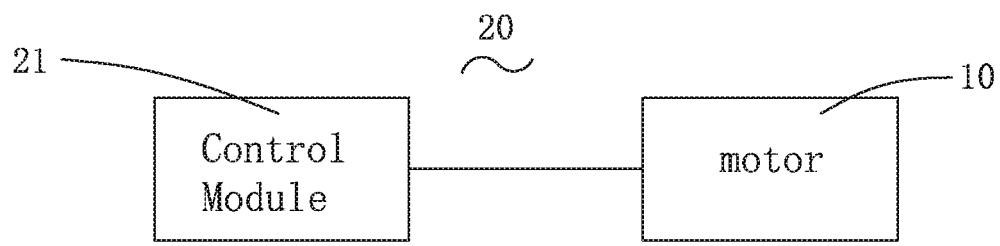
FIG. 9 is a module view of a driving device of the motor.

Please refer to FIG. 9, the present application discloses a driving device 20. The driving device 20 includes electrical connection of a control module 21 with the above-mentioned motor 10, the control module 21 and the motor 10. The control module 21 is used to adjust the current of the power coil 14 and the auxiliary coil 122 by the feedback signal obtained by sensing the motion of the vibrator 13 to control the vibrator 13 to move reciprocally.

Relative to the prior art, in the embodiment of the present application, the positioning sensor can sense motion of the vibrator and obtains the feedback signal of the vibrator, the auxiliary coil and/or the power coil act on the vibrator to adjust reciprocating motion of the vibrator between the stoppers according to the feedback signal detected by the positioning sensor, and the motor can perform relatively good closed-loop control even if being affected by inconsistencies in manufacturing processes or worn in use, so that the motion effect is good and the control precision is high.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A motor including:
   a housing with an accommodation space;
   a plurality of spaced stoppers fixed on the housing, each stopper including a first iron core accommodated in the accommodation space and fixed on the housing and an auxiliary coil accommodated in the accommodation space and wound around the first iron core;
   a vibrator slidably mounted between the stoppers;
   a power coil for driving the vibrator;
   a positioning sensor for sensing the motion of the vibrator for obtaining a feedback signal; wherein
   the auxiliary coil and/or the power coil act on the vibrator so as to adjust the reciprocating motion of the vibrator between the stoppers, according to the feedback signal detected by the positioning sensor; the motor further including a limit member fixed on the plurality of spaced stoppers, the limit member is located on the opposite sides of the vibrator and fixed on one side of the first iron core facing the vibrator.

2. The motor as described in claim 1, wherein the positioning sensor locates on the housing, the power coil or the stopper.

3. The motor as described in claim 1, wherein the positioning sensor is a hall sensor.

4. The motor as described in claim 1, further including a spring located between the stopper and the vibrator; wherein two ends of the spring are connected with the limit member and the vibrator separately.

5. The motor as described in claim 1, wherein the housing includes a barrel-shaped main body having an accommodation space, and a cover body part covering on the opening of two sides of the main body; the vibrator is slidably connected in the main body; the first iron core is fixed on the cover body part; and the power coil is wound on one side of the main body away from the vibrator.

6. The motor as described in claim 1, wherein the vibrator is a permanent magnet.

7. The motor as described in claim 1, wherein the vibrator includes a second iron core located in a center position and a permanent magnet fixed on two ends of the second iron core; the power coil is wound around the second iron core.

8. The motor as described in claim 7, wherein polarity of the permanent magnets fixed on two ends of the second iron core are oppositely configured.

9. A driving device including a control module and the motor as described in claim 1, wherein the control module and the motor are connected electrically; the control module is used to adjust the power coil and the auxiliary coil according to the feedback signal obtained by the positioning sensor sensing the motion of the vibrator.

10. A driving device including a control module and the motor as described in claim 2, wherein the control module and the motor are connected electrically; the control module is used to adjust the power coil and the auxiliary coil according to the feedback signal obtained by the positioning sensor sensing the motion of the vibrator.

11. A driving device including a control module and the motor as described in claim 3, wherein the control module and the motor are connected electrically; the control module is used to adjust the power coil and the auxiliary coil according to the feedback signal obtained by the positioning sensor sensing the motion of the vibrator.

12. A driving device including a control module and the motor as described in claim 1, wherein the control module and the motor are connected electrically; the control module is used to adjust the power coil and the auxiliary coil according to the feedback signal obtained by the positioning sensor sensing the motion of the vibrator.

13. A driving device including a control module and the motor as described in claim 4, wherein the control module and the motor are connected electrically; the control module is used to adjust the power coil and the auxiliary coil according to the feedback signal obtained by the positioning sensor sensing the motion of the vibrator.

14. A driving device including a control module and the motor as described in claim 5, wherein the control module and the motor are connected electrically; the control module is used to adjust the power coil and the auxiliary coil according to the feedback signal obtained by the positioning sensor sensing the motion of the vibrator.

15. A driving device including a control module and the motor as described in claim 6, wherein the control module and the motor are connected electrically; the control module is used to adjust the power coil and the auxiliary coil according to the feedback signal obtained by the positioning sensor sensing the motion of the vibrator.

16. A driving device including a control module and the motor as described in claim 7, wherein the control module and the motor are connected electrically; the control module is used to adjust the power coil and the auxiliary coil according to the feedback signal obtained by the positioning sensor sensing the motion of the vibrator.

17. A driving device including a control module and the motor as described in claim 8, wherein the control module and the motor are connected electrically; the control module is used to adjust the power coil and the auxiliary coil according to the feedback signal obtained by the positioning sensor sensing the motion of the vibrator.

* * * * *